United States Patent
Takanashi et al.

(10) Patent No.: US 6,339,465 B1
(45) Date of Patent: Jan. 15, 2002

(54) IMAGE PROCESSING APPARATUS

(75) Inventors: Teruo Takanashi; Teturou Kanafusa, both of Ashigarakami-gun (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/440,288

(22) Filed: Nov. 15, 1999

(30) Foreign Application Priority Data

Feb. 17, 1999 (JP) ............................................. 11-038457

(51) Int. Cl.[7] ........................ G03B 27/00; G03B 27/72; G03B 27/52
(52) U.S. Cl. ............................... 355/18; 355/35; 355/40
(58) Field of Search .............................. 355/35, 40, 41, 355/38, 18; 382/254–255, 293; 348/264; 396/311

(56) References Cited

U.S. PATENT DOCUMENTS

| | | | | |
|---|---|---|---|---|
| 4,445,195 A | * | 4/1984 | Yamamoto | 364/900 |
| 5,345,317 A | * | 9/1994 | Katsuno et al. | 358/429 |
| 5,630,036 A | * | 5/1997 | Sonohara et al. | 395/131 |
| 5,712,700 A | * | 1/1998 | Nagaishi et al. | 355/35 |
| 6,088,544 A | * | 1/2000 | Saito | 396/311 |

* cited by examiner

Primary Examiner—Russell Adams
Assistant Examiner—Hung Henry Nguyen
(74) Attorney, Agent, or Firm—Morgan, Lewis & Bockius LLP

(57) ABSTRACT

There is disclosed an image processing apparatus in which it is determined whether comment information exists inside a frame image entered from a photographic film, and in the event that the presence of the comment information is confirmed, a pixel value of the comment information is replaced by another pixel value.

8 Claims, 12 Drawing Sheets

Fig. 6

COMMENT ERASE

1. PRINT WITH COMMENTS
2. COMMENT ERASE 1
3. COMMENT ERASE 2
4. COMMENT ERASE 3

[OK] [CANCEL]

IMAGE PROCESSING APPARATUS

BACKGROUND OF THE INVENTION

1. Field of the Invention

The present invention relates to an image processing apparatus in which an image is entered from a developed photographic film and an image processing is applied to the image.

2. Description of the Related Art

Hitherto, there is widely spread a system for obtaining a printed photograph in which a photographic film is loaded onto a camera to take a photograph, the photographic film after a photograph is developed to form an image (generally, a negative image) on the photographic film, the image on the photographic film is printed on a photographic printing paper, and the photographic printing paper is developed, so that a printed photograph is formed. An apparatus, wherein an image on a photographic film after a development is printed on a photographic printing paper and then the photographic printing paper is developed, which is one of an apparatus constituting the above-mentioned system, is referred to generally as a photographic printer.

Recently, with respect to such a photographic printer, there is known a so-called digital printer wherein a printed photograph is formed in such a manner that an image recorded on a photographic film after a development is read on a photoelectric basis using a CCD photosensor and the like, various types of image processing are applied to the image (in order to avoid troublesomeness in expression, an image on data is also simply referred to as an image) thus obtained through the reading, a laser beam is modulated in accordance with the image after processing, the image is printed on a photographic printing paper by the modulated laser beam, and the photographic printing paper after printed is developed.

According to such a digital printer, in order to obtain a printed photograph excellent in density and color, an image, which is obtained through reading on a photoelectric basis from a developed photographic film, is displayed on a display screen to perform an examination as to density and color, and in addition a designation for a number of sheets to be printed and a printing magnification is performed. A result of the examination as to density and color is reflected, for example, on an image processing condition in an image processing, and the image processing condition, on which the result of the examination is reflected, is used to perform the image processing. A laser beam for printing on a photographic printing paper is modulated in accordance with the image after the image processing. Thus, it is possible to obtain a printed photograph favorable in density and color.

Further, it is known that according to the digital printer, it is possible to obtain an image favorable in density and color in such a manner that to perform an examination, an image of each frame is read preliminarily roughly at high speed from a developed photographic film (this is referred to as a pre-scanning), the image thus obtained by the pre-scan is examined, and a result of the examination is reflected on an image reading condition so that a color of a projection light is corrected and a reading time is controlled to read the image with greater accuracy (this is referred to as a fine-scanning).

Furthermore, there is known a technology of contributing to improving an image quality in such a manner that the fine-scan is performed taking a result of an examination into an image reading condition, and an image processing is applied to the image obtained through the fine-scan taking the result of the examination into an image processing condition too.

Recently, a system referred to as an APS (Advanced Photo System) is used. This system is provided with an information recording section for magnetically or optically recording information on a photographic film, and has such a function that information is recorded onto the information recording section at the time of taking a photograph by a camera onto which the photographic film is loaded, and at the time of printing the information recorded onto the information recording section is read and reflected on the print. The use of a photographic film and a camera suitable for such a system makes it possible that photographic date and/or other comment information are recorded onto the information recording section and comment information such as photographic date is recorded on a printed photograph together, or alternatively that at the time of taking a photograph, comment information such as photographic date is recorded, but a printed photograph free from a record of such a comment information is obtained.

However, now, a color negative film referred to as 135 film is most widely spread, and a camera onto which such a film is loaded for a photograph is also widely spread. Consequently, even if the APS appears, the conventional system as mentioned above will be also used. But, according to the conventional system as mentioned above, comment information such as photographic date is optically recorded directly in a photographic exposure area at the time of taking a photograph and thus it is a part of a frame image on a developed photographic film. Accordingly, it is determined at the time of taking a photograph as to whether comment information such as photographic date is recorded. At the time of taking a photograph, if comment information such as photographic date is recorded, the comment information appears on the printed photograph as it is.

In the conventional system as mentioned above, as a technology of obtaining a printed photograph in which comment information such as photographic date is removed from a photographic film on which the comment information such as photographic date is recorded at the time of taking a photograph, there is known a technology that such a comment information is recorded at a position along an edge of a frame image, and thus only a center portion of the frame image excluding a portion of the comment information is extended and printed.

However, in the event that an important camera subject exists also in a peripheral portion of the frame image, for example, as in a collective photograph, if the above-mentioned technology is applied, there will be a possibility that a printed photograph having no camera subject offers.

SUMMARY OF THE INVENTION

In view of the foregoing, it is an object of the present invention to provide an image processing apparatus capable of removing comment information, even if the comment information is optically recorded inside a frame image at the time of taking a photograph, without making sacrifice of an image of a peripheral portion.

To achieve the above-mentioned object, the present invention provides an image processing apparatus comprising:

an input unit for inputting an image from a developed photographic film;

a determination unit for determining whether comment information recorded by a camera at the time of taking a photograph exist inside the image entered from said input unit; and an erase unit for erasing comment information in an image or for making difficult to visually recognize the comment information by replacing a pixel value of the comment information inside the image confirmed in presence of the comment information by said determination unit by another pixel value.

According to an image processing apparatus of the present invention, it is determined whether comment information exists inside a frame image entered from a photographic film, and in the event that the presence of the comment information is confirmed, a pixel value of the comment information is replaced by another pixel value. This feature makes it possible to remove comment information, without making sacrifice of an image of a peripheral portion.

In the image processing apparatus as mentioned above, it is preferable that the image processing apparatus further comprises a storage unit for storing information of specifying a position inside the image involved in a possibility of the presence of the comment information, wherein said determination unit determines the presence of the comment information in accordance with the information stored in said storage unit.

Comment information recorded on a photographic film can be approximately specified in its recording position, while it is different depending on a camera. Thus, in the event that such comment information exists, a position of the comment information is registered beforehand. And thus, it is possible to decide the presence of the comment information in accordance with the position information.

Further, in the image processing apparatus as mentioned above, it is preferable that the image processing apparatus further comprises a storage unit for storing information of specifying a color and/or a density of the comment information, wherein said determination unit determines the presence of the comment information in accordance with the information stored in said storage unit.

A color of comment information is approximately determined, while the comment information recorded on a photographic film is different depending on a camera. Thus, in the event that such comment information exists, information as to a color and/or a density of the comment information is registered beforehand. And thus, it is possible to decide the presence of the comment information in accordance with such information.

Furthermore, in the image processing apparatus as mentioned above, it is preferable that the image processing apparatus further comprises a storage unit for storing information of specifying at least one of a color and a density of the comment information, and a position inside the image involved in a possibility of the presence of the comment information, wherein said determination unit determines the presence of the comment information in accordance with the information stored in said storage unit.

As mentioned above, comment information recorded on a photographic film can be approximately specified in its recording position, and a color of the comment information is determined, while it is different depending on a camera. Thus, information of specifying at least one of a color and a density of the comment information, and a position of the comment information is registered beforehand. And thus it is possible to decide with greater accuracy the presence of the comment information through determination as to whether one associated with the color and density exists at the associated position.

Further, in the image processing apparatus as mentioned above, it is preferable that said erase unit replaces a pixel value of the comment information by a pixel value produced in accordance with a pixel value of an area closed to the comment information.

This feature makes it possible to more clearly erase the comment information as compared with a scheme in which the comment information is covered evenly with for example black or gray.

BRIEF DESCRIPTION OF THE DRAWINGS

FIG. 6 is an illustration of a comment erase screen.

DETAILED DESCRIPTION OF PREFERRED EMBODIMENTS

Embodiments of the present invention will be described with reference to the accompanying drawings. Here, there will be described a digital printer into which an image processing apparatus according to an embodiment of the present invention is incorporated.

Figure 1:
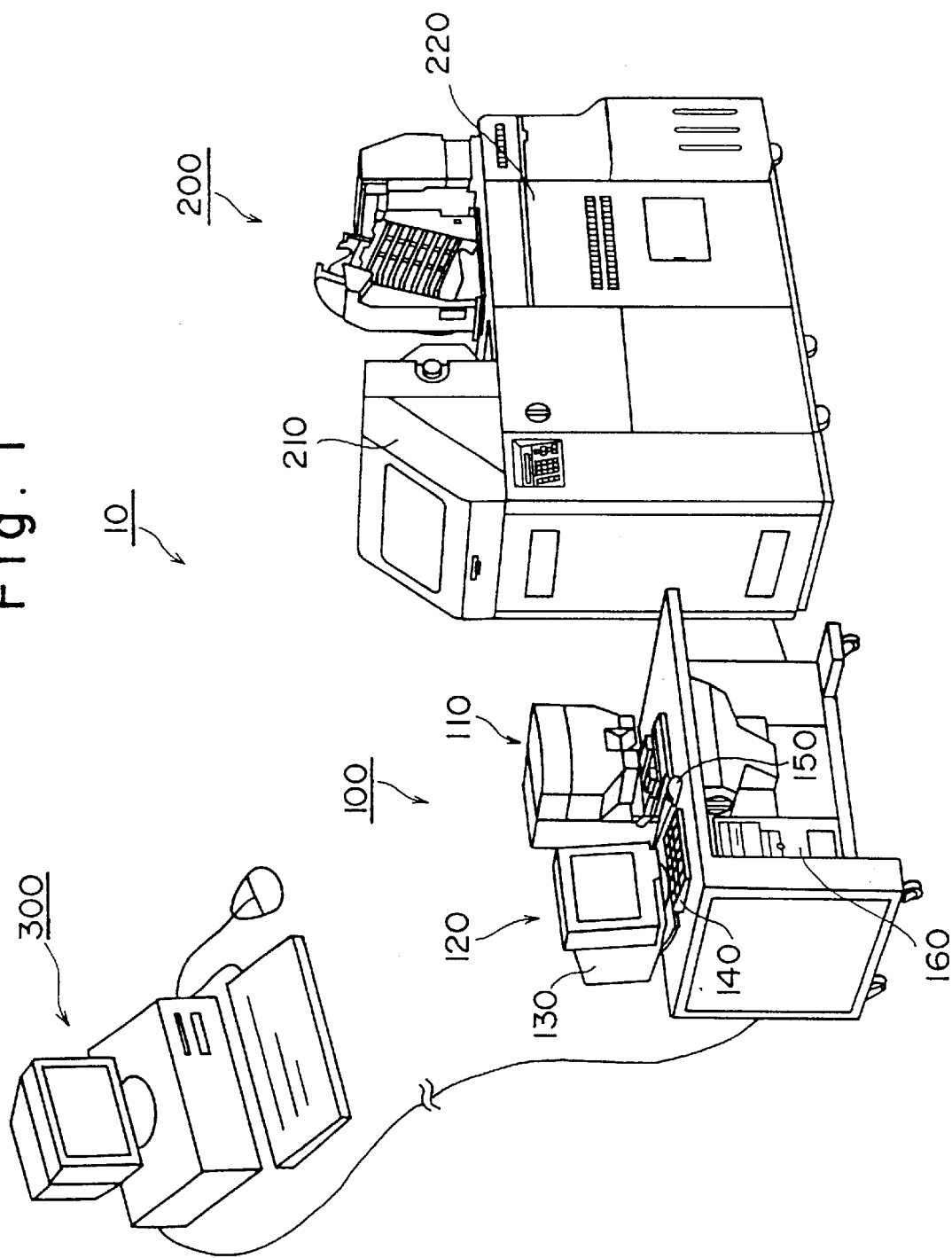
FIG. 1 is a perspective view of a digital printer by way of example.

FIG. 1 is a perspective view of a digital printer by way of example.

As shown in FIG. 1, a digital printer 10 comprises an image input system 100 and an image output system 200. According to the example, an external personal computer 300 is connected to the image input system 100.

The image input system 100 comprises a scanner unit 110 for sequentially reading on a photoelectric basis a plurality of frames of images recorded on an undeveloped photographic film from the photographic film, and an image examination processing unit 120 for performing an examination for images read by the scanner unit 110 and in addition for performing an image processing. The image examination processing unit 120 comprises a CRT display unit 130, a dedicated keyboard 140, a mouse 150 and a circuit unit 160. The circuit unit 160 comprises a computer circuit unit constituting a computer system together with the CRT display unit 130, the dedicated keyboard 140 and the mouse 150, and an image processing substrate which is an image processing-dedicated hardware. Details will be described later.

The image output system 200 comprises a laser printer unit 210 for exposing an image on a photographic printing paper by scanning laser beams modulated in accordance with an image obtained through the image input system 100, and a processor unit 220 for developing the photographic printing paper exposed by the laser printer unit 210 to obtain a printed photograph. An internal structure of the image output system 200 will be described later.

Figure 2:
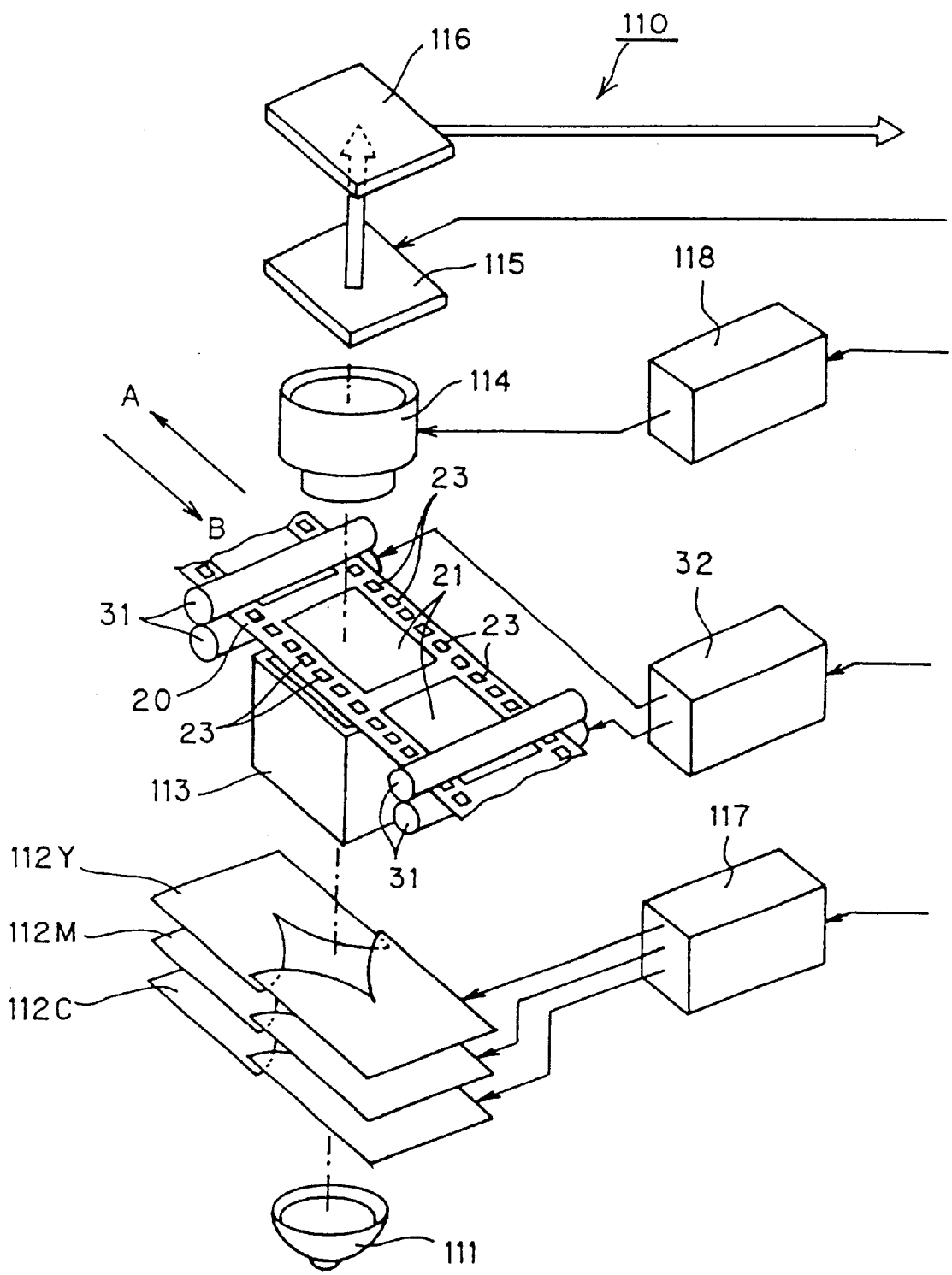
FIG. 2 is a typical illustration showing a structure of a scanner unit of an image input system.

FIG. 2 is a typical illustration showing a structure of the scanner unit 110 of the image input system 100.

Here, a developed photographic film 20 is set to a film carrier (not illustrated) having a feed roller 31 and a feed driving unit 32, and the feed roller 31 is driven by the feed driving unit 32 so that the photographic film 20 is fed in an arrow A direction to perform a pre-scanning, and when an examination operation, which will be described later, is performed, the photographic film 20 is fed in an arrow B direction to perform a fine-scanning. On the photographic film 20, a plurality of frame images 21 are recorded and a plurality of perforations 23 are provided along the both edges.

The scanner unit 110 is provided with a light source 111 comprising, for example, a halogen lamp, a metal halide lamp or the like. Light emanated from the light source 111 passes through three filters 112C, 112M and 112Y, through which light of C (cyan), light of M (magenta) and light of Y (yellow) are transmitted, respectively, and further passes through a diffusion box 113, and then irradiates the photographic film 20. The light transmitted through the photographic film 20 is applied via a zoom lens 114 to a CCD photo sensor 115. On a plane including a sensor surface of the CCD photo sensor 115, an image recorded on the photographic film 20 is formed by an effect of the zoom lens 114. An image signal generated by the CCD photo sensor 115 is converted by an A/D converter 116 to a digital image data (here, for the purpose of simplification, it happens that an image on data is also referred to as an image), and then transmitted to the circuit unit 160 (cf. FIG. 1).

Each of three filters 112C, 112M and 112Y has at its center an aperture through which light passes independent of an effect of the filter. With respect to the periphery of the aperture, light affected by an effect of the filter is transmitted. A filter control unit 117 controls a size of each of the filters 112C, 112M and 112Y so that an effect of the associated filter is controlled. Lights passed through the filters 112C, 112M and 112Y are diffused within a diffusion box 113 and becomes a uniform light, so that the photographic film 20 is irradiated with the uniform light.

An image on the photographic film 20 is formed on a surface of the CCD photo sensor 115 by the zoom lens 114. The zoom lens 114 is driven by a zoom lens driving unit 118 to control a focal length of the zoom lens 114, so that an image of a magnification according to a focal length of the zoom lens 114 is formed on a sensor surface of the CCD photo sensor 115. The CCD photo sensor 115 comprises a plurality of line sensors in each of which a large number of detector elements are arranged in a width direction of the photographic film 20. Three line of line sensors are arranged in a direction of feeding of the photographic film 20. On surfaces of their line sensors, there are disposed color separation filters of R (red), G (green) and B (blue), respectively. Thus, those three line sensors read components of R (red), G (green) and B (blue) of a frame image recorded on the photographic film 20, respectively. An image reading by the three line sensors is repeatedly performed while the photographic film 20 is fed in a direction of the arrow A or in a direction of the arrow B, so that a frame image, which is expanded two-dimensionally on the photographic film 20, can be read.

Here, at the time of the pre-scanning wherein the photographic film 20 is fed in a direction of the arrow A and an image reading is performed by the CCD photo sensor 115, a feeding speed of the photographic film 20 is fast, and each of the line sensors constituting the CCD photo sensor 115 performs the image reading only with the detector elements which are thinned out suitably, and as a result, a rough image is obtained.

At the time of the pre-scanning, the three filters 112C, 112M and 112Y are controlled in such a manner that their apertures offer a predetermined aperture size. After the pre-scanning, the examination operation, which will be described later, is performed. In the fine-scanning which are performed after the examination operation, the three filters 112C, 112M and 112Y are controlled in accordance with a result of the examination on each frame image, and as the need arises, the zoom lens 114 is adjusted to a focal length according to the print magnification designated at the time of the examination operation, and the photographic film 20 is fed in a direction of the arrow B at the speed according to a result of the examination, and the CCD photo sensor 115 performs the image reading in a manner of thinning (or no thinning) according to the designated print size. As mentioned above, the image signal generated by the CCD photo sensor 115 is converted by the A/D converter 116 to a digital image data, and then transmitted to the circuit unit 160 (cf. FIG. 1).

Figure 3:
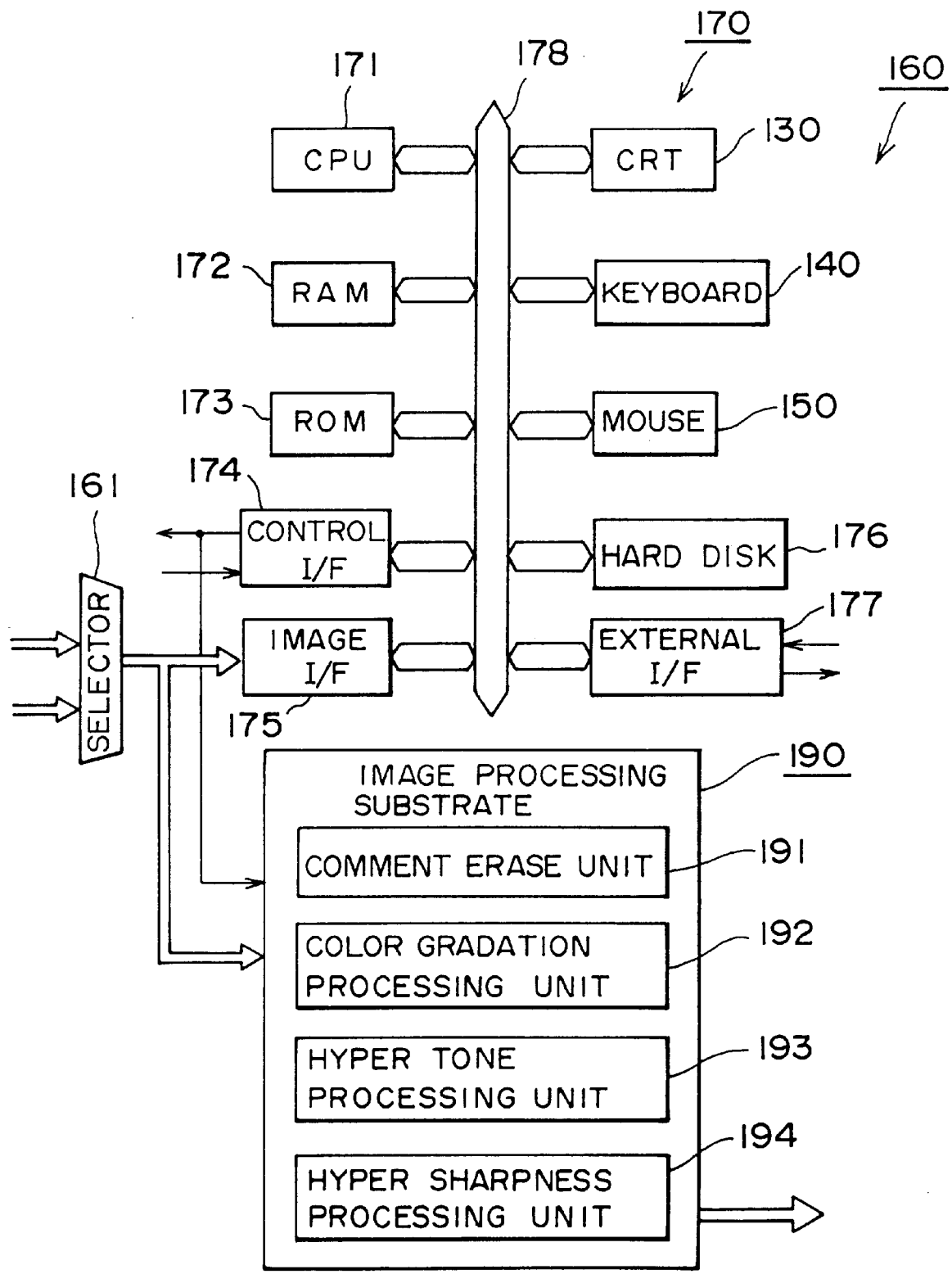
FIG. 3 is a block diagram of a circuit unit constituting an image input system.

FIG. 3 is a block diagram of the circuit unit constituting the image input system.

The circuit unit 160 comprises a computer circuit unit 170 and an image processing substrate 190.

The computer circuit unit 170 comprises a CPU 171 for executing various sorts of programs, a RAM 172 used as a work area when various sorts of programs are executed by the CPU 171, a ROM 173 for storing constants and the like, a control interface 174 for transferring control signals to perform a control for the respective units of the image input system 100, an image interface 175 for entering an image obtained in the scanner unit 110 and for outputting an image toward the image processing substrate 190, the CRT display unit 130, the dedicated keyboard 140, the mouse 150, a hard disk 176, and an external interface 177 for performing a transfer of data with apparatuses different from the image input system 100, for example, the image output system 200 and the external personal computer 300 shown in FIG. 1. Those are mutually connected with each other through a bus 178.

According to the present embodiment, the control interface 174 sends control signals to the feed driving unit 32, the filter control unit 117 and the zoom lens driving unit 118. Upon receipt of the control signals, the feed driving unit 32, the filter control unit 117 and the zoom lens driving unit 118 perform a feed of the photographic film 20, a control of the filters 112C, 112M and 112Y, and a control of a focal length (a control of an imaging magnification) of the zoom lens 114, respectively. Further, the control interface 174 outputs a control signal to control the CCD photo sensor 115, a control signal to switch a selector 161 shown in FIG. 3, and control signals to control other portions of the image input system 100. The control interface 174 receives signals from various sensors (not illustrated) of the image input system.

Further, the control interface 174 transmits to the image processing substrate 190, of a result of an examination obtained through an examination operation (which will be described later), information necessary for an image processing.

The image processing substrate 190 comprises a comment erase unit 191 for erasing, in the event that comment information such as a photographic date exists inside an image obtained through reading over a photographic film, such comment information in accordance with an instruction from the computer circuit unit 170, a color gradation processing unit 192 for correcting a color gradation of an image, a hyper tone processing unit 193 for compressing a gradation of an extremely low frequency component of an image, and a hyper sharpness processing unit 194 for enhancing a sharpness of an image while controlling graininess of the image.

As the scanner unit 110 performs a pre-scanning, an image obtained through the pre-scanning is entered to the computer circuit unit 170 for an examination. When the examination is performed, various sort of control signals associated with an image reading condition according to a result of the examination are transmitted to the scanner unit 110, and information representative of an image processing condition according to a result of the examination is transmitted to the image processing substrate 190. Thus, the scanner unit 110 performs a fine-scanning, and an image obtained through the fine-scanning is entered to the image processing substrate 190 so that various sorts of image processing are performed. An image subjected to the image processing is transmitted to the image output system 200 (cf. FIG. 1), and is used as a signal for a laser beam modulation in an exposure by a laser beam.

In the present embodiment, the scanner unit 110 for reading an image from the photographic film 20 corresponds to the input unit for inputting an image from the developed photographic film, referred to in the present invention. The determination unit for determining whether an entered image includes comment information, referred to in the present invention, comprises in the present embodiment a hardware of the computer circuit unit 170 and a processing of determination as to whether the comment information exists, which processing is executed by the computer circuit unit 170. The erase unit for erasing comment information in an image or for making difficult to visually recognize the comment information, referred to in the present invention, corresponds to the comment erase unit 191, in the present embodiment.

According to the present embodiment, an image, in which comment information is erased or made difficult to be visually recognized, is transmitted to the image output system 200. However, it is acceptable to provide such an arrangement that the image is outputted to the exterior (for example, the personal computer 300 shown in FIG. 1), or alternatively to provide such an arrangement that the image is returned to the computer circuit unit 170 and is stored in a portable type of recording medium (not illustrated), for example, a CD-R and the like.

Figure 4:
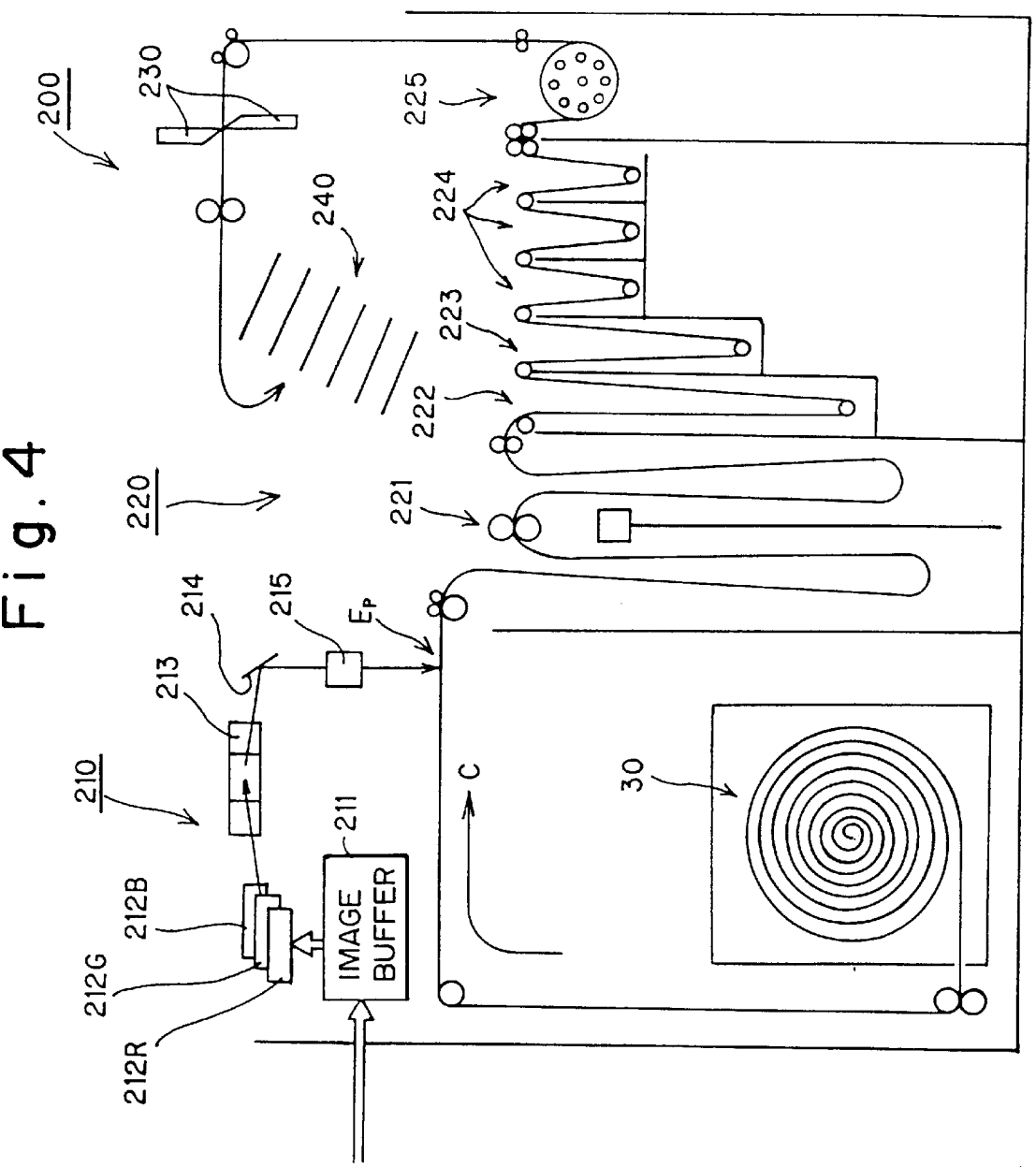
FIG. 4 is a typical illustration of an internal structure of an image output system.

FIG. 4 is a typical illustration of an internal structure of an image output system 200.

A rolled unexposed photographic printing paper 30 is loaded inside the image output system 200. The photographic printing paper 30 is pulled out of the image output system 200, and is transmitted via a laser printer unit 210 and a processor unit 220 to a cutter 230 so that the photographic printing paper 30 is cut out one by one frame. The pieces of the photographic printing paper 30 thus cut out are stacked up onto a sorter 240.

An image outputted from the image processing substrate 190 and transmitted to the image output system 200 is temporarily stored in an image buffer 211 constituting a laser printer unit 210.

The laser printer unit 210 is provided with three laser beam sources 212R, 212G and 212B for emitting R (red) color of laser beam, G (green) color of laser beam and B (blue) color of laser beam, respectively. The laser beam sources 212R, 212G and 212B are driven in accordance with color separation images of R, G and B stored in the image buffer 211, respectively, so as to emit laser beams modulated in accordance with the associated drive. The laser beams thus emitted from the laser beam sources 212R, 212G and 212B are repeatedly reflected and deflected by a rotating polygon mirror 213, and then reflected by a mirror 214, so that the laser beams thus reflected passes through an fθ lens 215 for controlling a size of spot on the photographic printing paper 30, and repeatedly scans the photographic printing paper 30 on an exposure unit Ep in a direction perpendicular to a paper surface of FIG. 4. While the photographic printing paper 30 is conveyed in a direction of an arrow C, an image is exposed on the photographic printing paper 30.

After the exposure, the photographic printing paper 30 is conveyed to a processor unit 220. In the processor unit 220, first, a conveyance speed of the photographic printing paper 30 is controlled in a reservoir unit 221. And thereafter, a color development is performed in a developing tank 222, a bleach-fix is performed in a fixing tank 223, a rinsing processing is performed in a rinsing tank 224, and a drying is performed in a drying unit 225. And thereafter, as mentioned above, in the cutter 230, the photographic printing paper 30 is cut out one by one frame. The pieces of the photographic printing paper 30 thus cut out are stacked up onto a sorter 240.

Next, there will be explained an examination operation again referring to the image inputting system 100.

Figure 5:
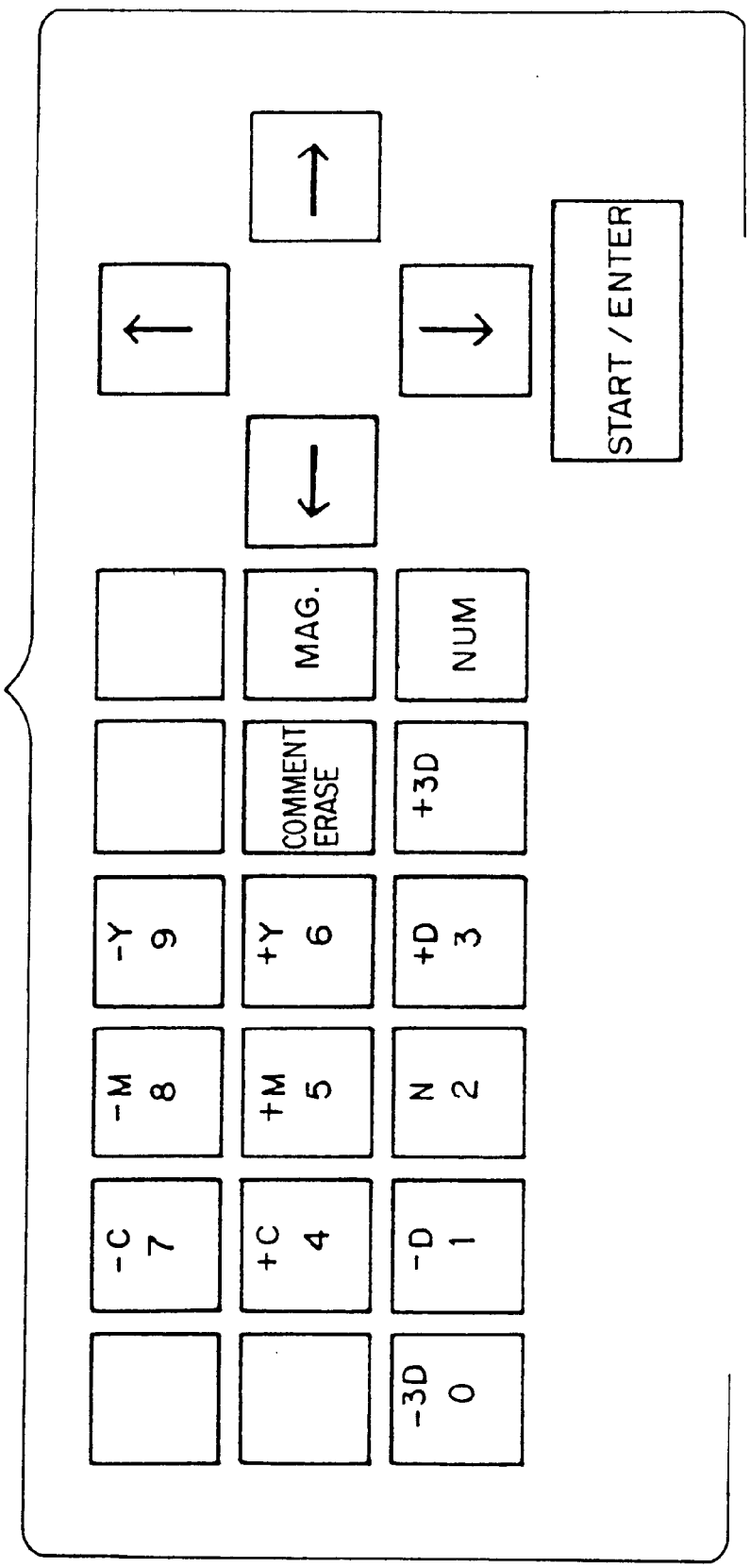
FIG. 5 is an illustration of various operating keys constituting a keyboard.

FIG. 5 is an illustration of various operating keys constituting the keyboard 140 shown in FIGS. 1 and 3.

Functions of the operating keys shown in FIG. 5 are as follows.

−3D: Step down the image density by 3 steps.
−D: Step down the image density by 1 step.
N: Return the image density to the non-controlled state.
+D: Step up the image density by 1 step.
+3D: Step up the image density by 3 steps.
+C: Step up the color density of cyan by 1 step.
+M: Step up the color density of magenta by 1 step.
+Y: Step up the color density of yellow by 1 step.
−C: Step down the color density of cyan by 1 step.
−M: Step down the color density of magenta by 1 step.
−Y: Step down the color density of yellow by 1 step.

Here, a degree of the above-mentioned '1 step' implies a change of about 20% or so. However, it is possible to arbitrarily set up the degree of '1 step'.

Of the above-mentioned keys, all keys but +3D are used on a common basis to numeral keys of 0~9. The key of +3D is used on a common basis to a period key representative of a decimal point.

No.: Designate a number of sheets to be printed by a sequential depression of the key in combination with a numeral key.

Mag.: Designate a magnification of print by a sequential depression of the key in combination with a numeral key or the period key.

Comment Erase: Display a comment erase screen. The comment erase screen will be described later.

Four arrow keys: They are used for a movement of a frame (which will be described later) for a film frame selection on a display screen for a plurality of frames, and for a selection of items of a menu bar and a pull-down menu, when the menu bar and the pull-down menu are displayed on the display screen.

Start/Enter: Perform an instruction of a start of a fine-scanning operation, an instruction of a resumption of the interrupted fine-scanning operation, and a confirmation of an input operation.

On the keyboard, there are provided a plurality of keys other than the above-mentioned keys.

FIG. 6 is an illustration of a comment erase screen.

As the comment erase key of the keyboard shown in FIG. 5 is depressed, the comment erase screen appears. When the comment erase key is again depressed, or a cancel button on the comment erase screen is clicked through a mouse operation, the comment erase screen disappears.

"print with comments" in the comment erase screen is an icon for an instruction that in the event that an image read from a photographic film includes comment information, the print photograph including the comment information is formed as it is. Each of "comment erase 1", "comment erase 2" and "comment erase 3" is an icon for an instruction that in the event that an image read from a photographic film includes comment information, the print photograph erasing and excluding the comment information is formed.

As mentioned above, erasing of comment information is performed through an image processing by the comment erase unit 191 of the image processing substrate 190. It is noted, however, that the "comment erase 1", the "comment erase 2" and the "comment erase 3" are mutually different from one another in an image processing scheme. Details will be described later.

In the state that the comment erase screen is displayed, an arrow key is depressed to move a cursor (not illustrated) to any icon, and the start/enter key is depressed or any icon is clicked through the mouse operation and then an OK button is pushed. Those operations may select a processing associated with the icon so that the comment erase screen disappears. In the event that the "print with comments" is selected, the comment erase unit 191 of the image processing substrate 190 does not perform an image processing for erasing comment information. On the other hand, in the event that any of the icons of the "comment erase 1", the "comment erase 2" and the "comment erase 3" is selected, the comment erase unit 191 of the image processing substrate 190 performs erasing of comment information by an image processing according to the selected icon.

According to the present embodiment, a selection once implemented on the comment erase screen is effective until the comment erase screen is once more displayed and is operated again. However, in many cases, it is different for each series of photographic film in accordance with a request of a user as to whether the comment information is erased. Therefore, it is acceptable to provide such an arrangement that an operating mode is returned to a mode in which comment information is not erased whenever an examination operation for each series of photographic film is terminated.

FIGS. 7 to 10 are illustrations of a display screen displayed on the CRT display unit 130 at the time of an examination.

As shown in FIGS. 7 to 10, the CRT display unit 130 simultaneously displays a plurality of images (for example, here, six).

Six images shown in each of FIGS. 7 to 10 are numbered, from the left upper side, as No. 18, No. 17, No. 16, No. 15, No. 14 and No. 13 in the named order. Here it is assumed that with respect to a 24 series of photographic film now developed, a pre-scanning is performed for all 24 sheets of frame image in the order of frame images of No. 1, No. 2, . . . , No. 24, and then an examination is performed for the sheets of frame image in the order of frame images of No. 24, No. 23, . . . , No. 1, and a fine-scanning is performed. Further, here, it is assumed that an examination operation for six frame images of No. 24, No. 23, . . . , No. 19 have been already completed, and six frame images of No. 18, No. 17, . . . , No. 13 for the subsequent examination operation is displayed on the CRT display unit 130.

The pre-scanning is initiated when the developed photographic film 20 is set to the scanner unit 110 (cf. FIG. 2) and the Start/Enter key is depressed. When the pre-scanning for the whole frames is completed, six frames of images from the final frame of the pre-scanning are displayed on the CRT display unit 130.

Figure 7:
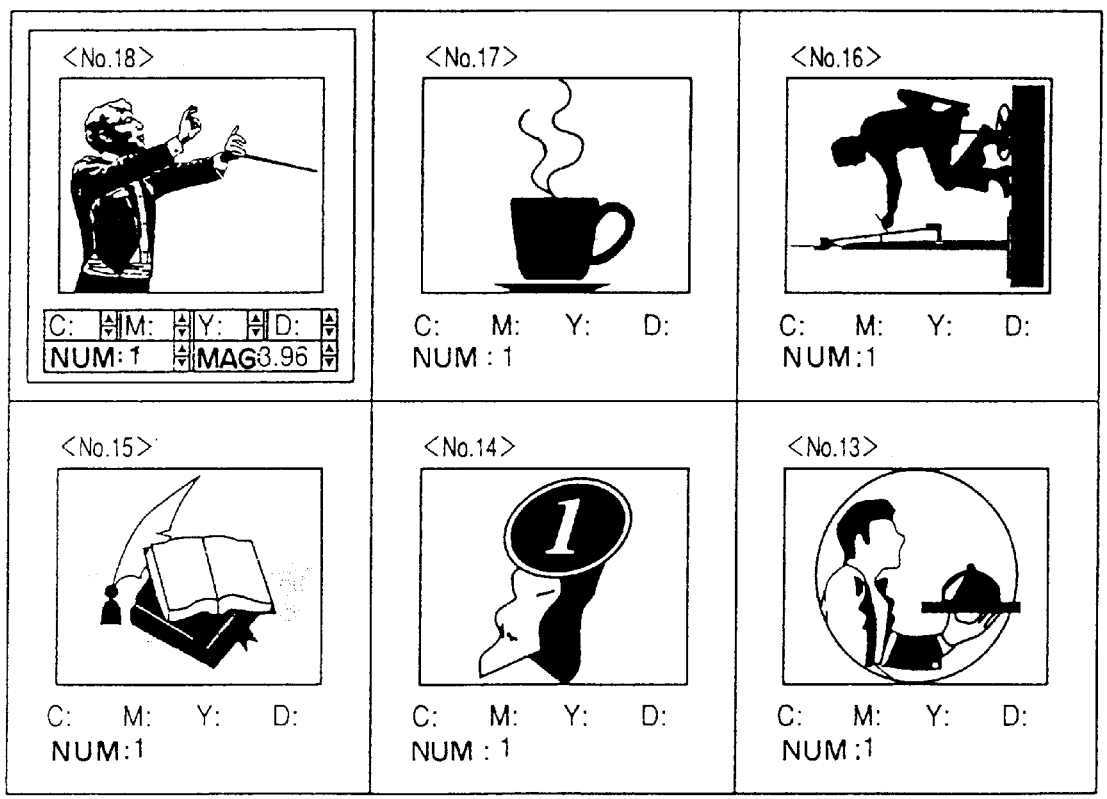
FIG. 7 is an illustration of a display screen displayed on a CRT display unit at the time of an examination.
Figure 8:
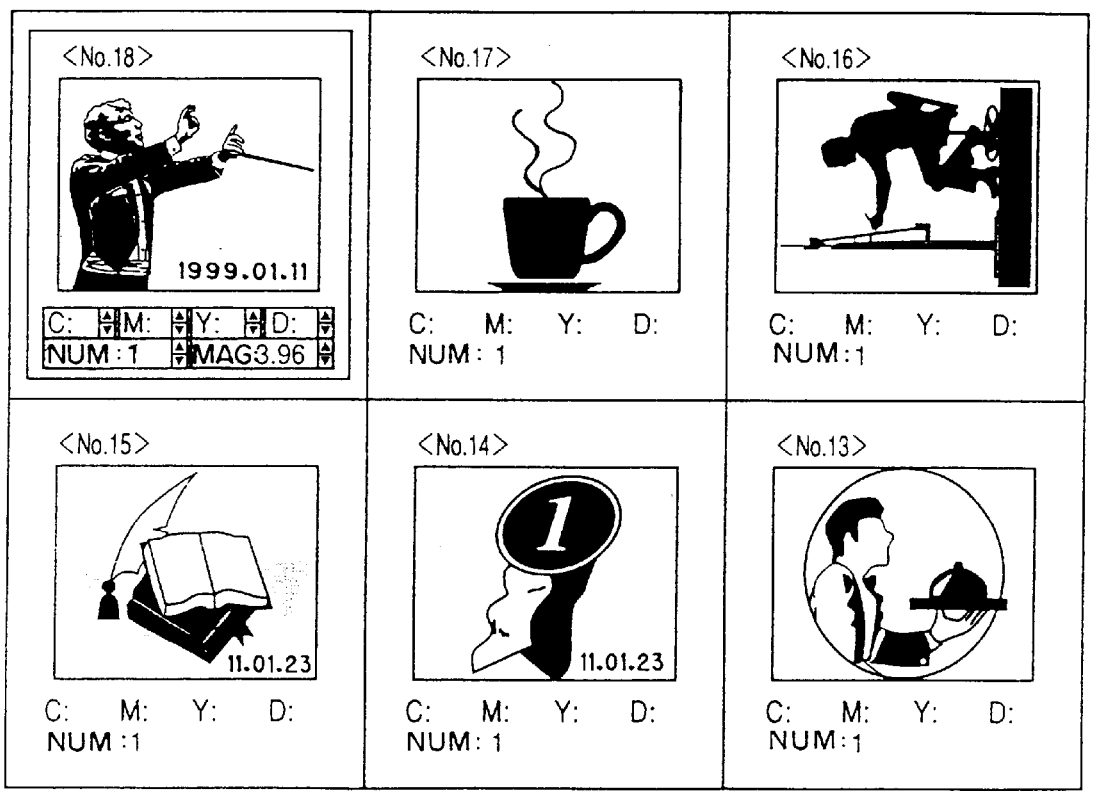
FIG. 8 is an illustration of a display screen displayed on a CRT display unit at the time of an examination.

Each of FIGS. 7 and 8 shows an initial screen for six frames of images of No. 18 to No. 13. When the examination operation for six frames of images of No. 24 to No. 19 is completed and the Start/Enter key is depressed, the initial screens for six frames of images of No. 18 to No. 13 shown in FIG. 7 or FIG. 8 are displayed.

FIG. 7 shows an initial screen in the event that any of the icons of the "comment erase 1", the "comment erase 2" and the "comment erase 3" is selected on the comment erase screen shown in FIG. 6. FIG. 8 shows an initial screen in the event that the icon of the "print with comment" is selected on the comment erase screen shown in FIG. 6. On the initial screen shown in FIG. 8, comment information "1999. 01. 11" appears on the frame image of No. 18, and comment information "11. 01. 23" appears on the frame images of No. 15 and No. 14. On the other hand, on the initial screen shown in FIG. 7, those pieces of comment information are erased.

Here, it is noted that the images obtained by pre-scanning are displayed for the purpose of an examination, and are directly fed from the scanner unit 110 shown in FIG. 2 to the computer circuit unit 170 shown in FIG. 3, but not passing through image processing substrate 190. Therefore, the comment information on the initial screen shown in FIG. 7 being erased implies that an image processing is performed on a software basis in the computer circuit unit 170 so that a degree of an erase is visually confirmed. When a degree of an erase is unsatisfactory, the comment erase screen shown in FIG. 6 is displayed so that another icon is selected over again from among the icons of the "comment erase 1", the "comment erase 2" and the "comment erase 3".

Hereinafter, the description will be continued assuming that an erase of comment information is instructed.

On an image (here, an image of No. 18) of the left upper on the initial screen shown in FIG. 7 (or FIG. 8), a frame for a frame selection is displayed. It is possible to perform an examination on an image in which the frame for a frame selection is displayed. An outline of the examination operation will be explained herein. When any of the icons of a triangle mark in the columns corresponding to C, M, Y and D in the frame for a frame selection is clicked through an operation of the mouse 150, this makes it possible to correct a density of the associated color (C, M, Y) or a density (image density D) of the whole image. The correction of color density/image density can be implemented also through the key operation (cf. FIG. 5) as mentioned above. Further, a click of the icon of a column of a number of print sheets in the frame for a frame selection makes it possible to increase or decrease a number of sheets to be printed, and a click of the icon of a column of a magnification makes it possible to alter a print magnification. Also with respect to set up of a number of sheets to be printed and a print magnification, it is possible to perform a set up of those elements through an operation of not only a mouse but also a keyboard.

Figure 9:
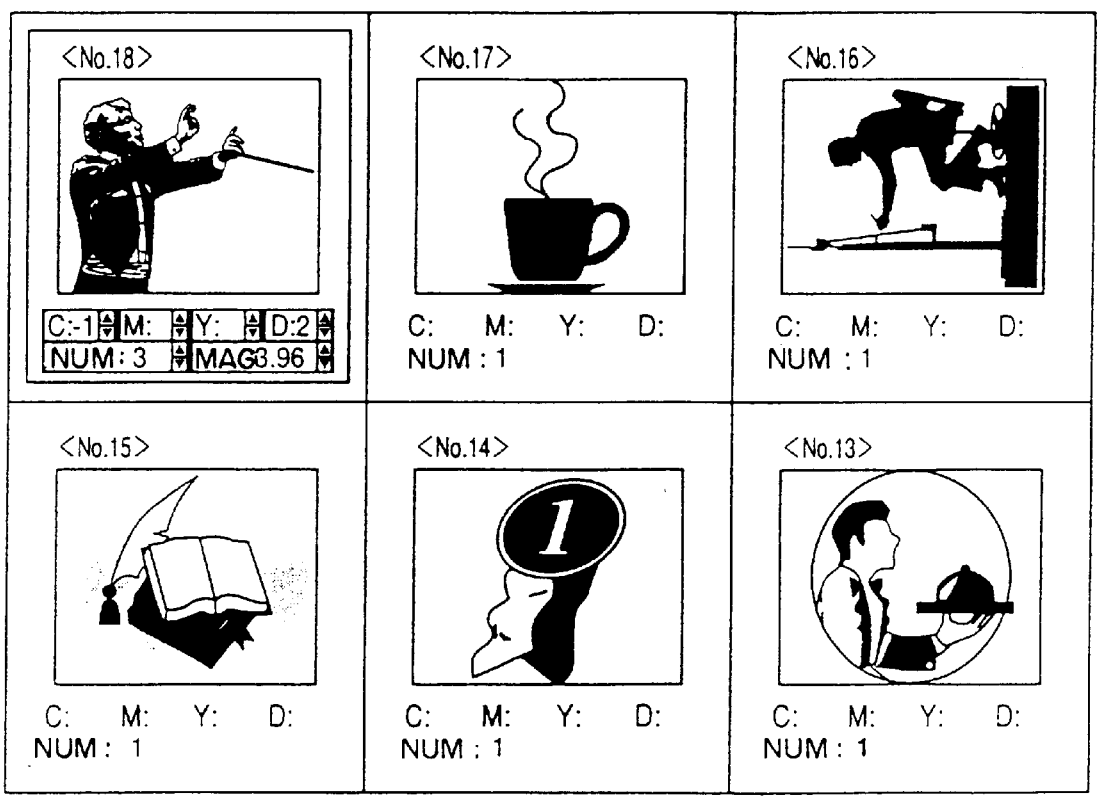
FIG. 9 is an illustration of a display screen displayed on a CRT display unit at the time of an examination.
Figure 10:
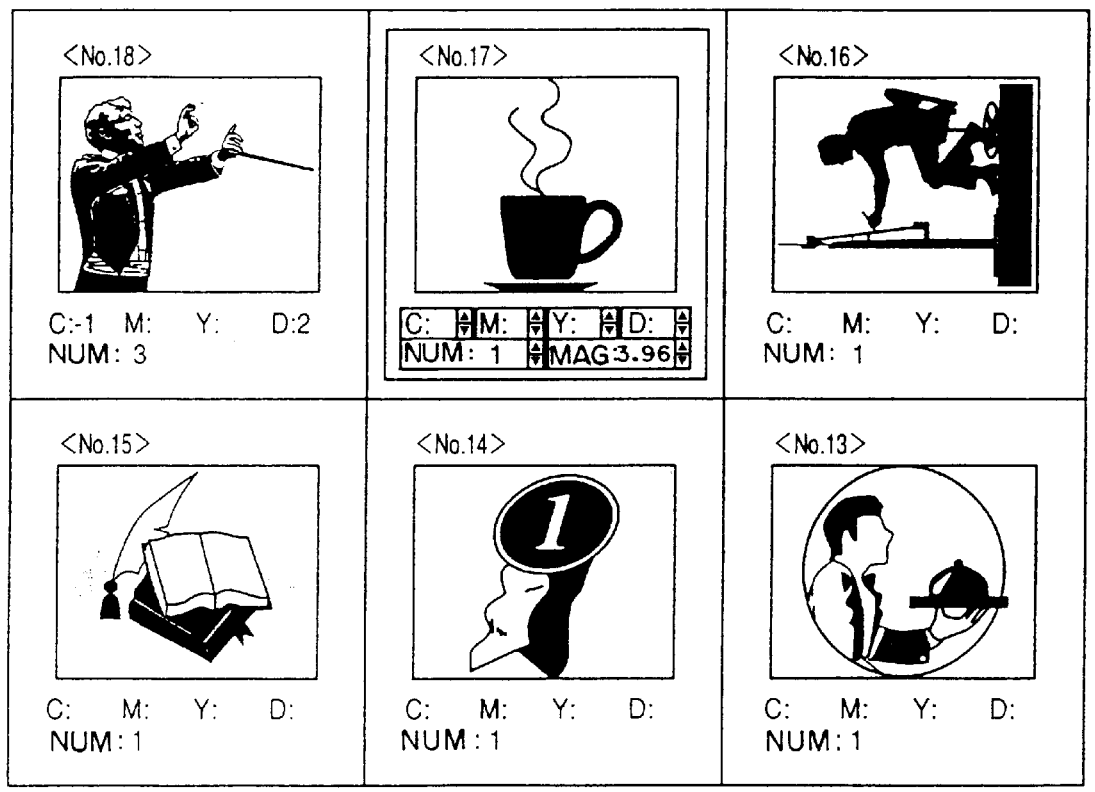
FIG. 10 is an illustration of a display screen displayed on a CRT display unit at the time of an examination.

FIG. 9 shows a six frame of images at the stage that an examination operation is performed with respect to the image of No. 18 wherein C is stepped down by 1, D is stepped up by 2, and a number of sheets to be printed is altered to 3. The print magnification 3.96 is an initial magnification and is not here altered. As an operation (a depression of an arrow indicating the right) for moving a frame for a frame selection is performed, as shown in FIG. 10, the frame for a frame selection is superposed on the image of No. 17 and displayed.

The above operation is repeated so that the examination operation is performed on a six frame of images in its entirety which are now displayed. And thereafter, when the Start/Enter key is depressed, a print instruction is issued for a six frame of images which are now displayed. When the print instruction is issued, a result of the examination for a six frame of images executed through the examination operation is reflected onto an image reading condition and an image processing condition, and the image reading condition is transmitted via the control interface 174 of the computer circuit unit 170 shown in FIG. 3 to the scanner unit 110 shown in FIG. 2. Then, a fine-scanning is performed for each of the frame images of No. 18 to No. 13 on the photographic film 20 under the image reading condition according to the associated frame image. The images obtained through the fine-scanning are fed to the image processing substrate 190 shown in FIG. 3. The image processing substrate 190 receives also the image processing condition outputted from the control interface 174, and applies an image processing for the image fed to the image processing substrate 190 under the image processing condition according to the associated image.

The image processing condition includes information as to whether comment information inside a frame image is to be erased, and information for designating an erasing processing algorithm in the event that the comment information is to be erased. To perform an image processing by the image processing substrate 190, in the event that the image processing condition includes information as to an instruction of erase comment information, the comment erase unit 191 performs also a comment information erase processing in accordance with the designated erase processing algorithm.

The image subjected to the image processing is transmitted to the image output system 200 (cf. FIGS. 1 and 4), so that the image output system 200 produces a print photograph on the basis of the image subjected to the image processing.

As the Start/Enter key is depressed, the subsequent group of six frames of images, that is, No. 12 to No. 7, is displayed, instead of six frames of images, that is, No. 18 to No. 13 now on display. And a frame for a film frame selection is displayed on an image (the image of No. 12) appearing at the left upper corner of the six frames of images, that is, No. 12 to No. 7 newly displayed.

This process is repeatedly performed so that the examination is completed as to the whole frame images of a single photographic film which is an object of the examination operation. Then, the photographic film is removed from the scanner unit 110 (cf. FIGS. 1 and 2), and the subsequent developed photographic film is set to perform a pre-scanning for the newly set photographic film.

Figures 11, 12:
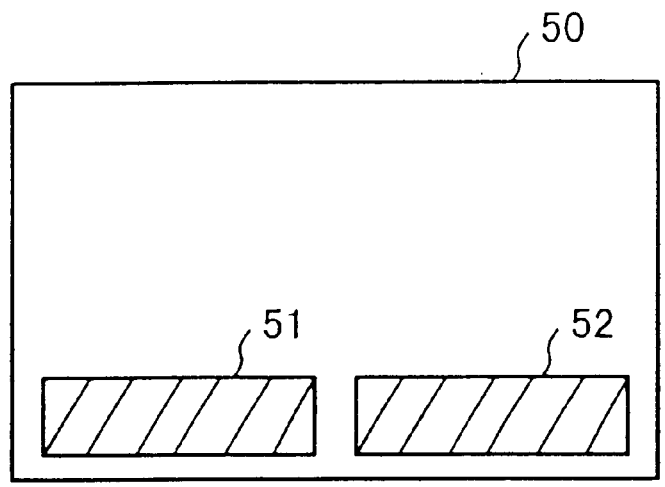
FIG. 11 is a view showing an exist position information of comment information inside a frame image, which comment information is stored in a hard disk in a computer circuit structure.
FIG. 12 is a view showing information representative of color and density of comment information which is stored in a hard disk in a computer circuit structure.

FIG. 11 is a view showing an exist position information of comment information inside a frame image, which comment information is stored in the hard disk 176 in the computer circuit unit 170. FIG. 12 is a view showing information representative of color density of comment information which is stored in the hard disk 176 in the computer circuit unit 170. In the present embodiment, the storage area of information in the hard disk 176, which will be described in conjunction with FIGS. 11 and 12, corresponds to the storage unit referred to in the present invention.

As shown in FIG. 11, according to the present embodiment, two areas (areas 51 and 52), assuming that comment information exists, for an external frame 50 of the frame image are designated. To detect whether comment information exists, these two areas 51 and 52 are examined. In some cases, it happens that the frame image is rotated 180° (reversed with respect to the upper portion and lower portion). Accordingly, in the determination as to whether comment information exists, when it is decided once that comment information does not exist, the frame image is rotated and it is examined once more whether comment information exists on the areas 51 and 52 on the rotated frame image. Alternatively, it is acceptable that the presence of the comment information is determined without rotation of the frame image in such a way that a number of areas for determination as to whether the comment information exists is increased assumed that the frame image is rotated 180°.

Further, as shown in FIG. 12, two pieces of information (color density range information 53, 54) each representative of the color and density ranges of C, M, Y are designated. Assuming that a comment information exists in the area 51 shown in FIG. 11, color and density of the comment information represent the color density range information 53. On the other hand, assuming that a comment information exists in the area 52 shown in FIG. 11, color and density of the comment information represent the color density range information 54.

The computer circuit unit 170, in the event that an erase of the comment information is instructed, determines as to the presence of the comment information on each of the frame images obtained through the pre-scanning based on information shown in FIGS. 11 and 12, and further in the event that the comment information exist, generates the detailed position information. In the present embodiment, a function of determining whether the comment information exist in the frame image, in the computer circuit unit 170, corresponds to the determination unit referred to the present invention.

In the computer circuit unit 170, further, the comment information detected in the manner as mentioned above is erased in accordance with the comment erase algorithm designated beforehand on the comment erase screen, and for example, as shown in FIG. 8, the frame image, in which the comment information thus erased, is displayed for an examination. When it is decided that the use of such an algorithm is not effective to erase the comment information well, then again the comment erase screen shown in FIG. 6 is opened to designate another algorithm. Then, the computer circuit unit 170 performs the comment erase processing in accordance with the newly designated algorithm, so that instead of the image displayed for the examination, an image, which has been subjected to the comment erase processing in accordance with the newly designated algorithm, is displayed.

When the examination for the displayed six frames of images is terminated and the Start/Enter key is depressed, as mentioned above, the image processing condition (including information specifying the designated comment erase algorithm and information representative of the detailed position of the detected comment information), which the examination result is reflected on, is produced and transmitted to the image processing substrate 190.

Figure 13:
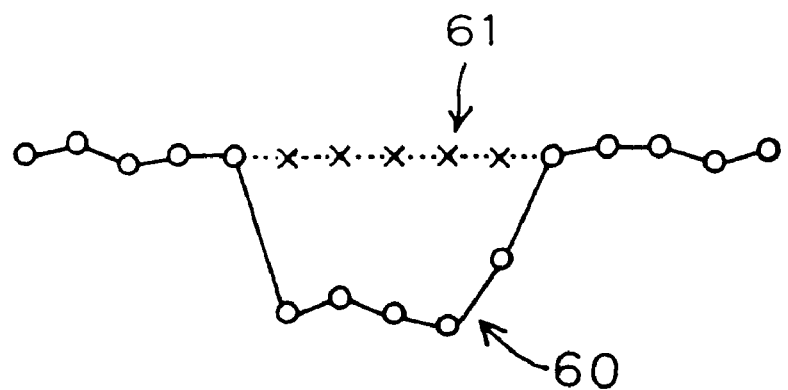
FIG. 13 is a view showing an example of a comment erase processing algorithm.
Figure 14:
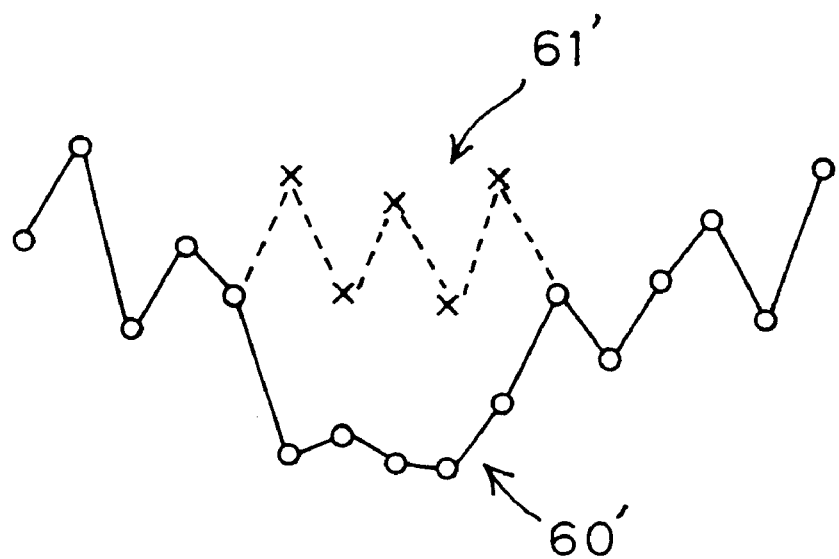
FIG. 14 is a view showing an alternative example of a comment erase processing algorithm.

FIG. 13 is a view showing an example of a comment erase processing algorithm. FIG. 14 is a view showing an alternative example of a comment erase processing algorithm.

FIG. 13 shows an algorithm which is preferably applied in the event that pixel values of both sides of comment information are relatively stable. The mean value of some pixel values of both sides of the comment information is determined, and a pixel value 60 of the comment information is replaced by the determined mean value 61.

FIG. 14 shows an alternative algorithm which is preferably applied in the event that pixel values of both sides of comment information are greatly dispersed. The mean value of some pixel values of both sides of the comment information and the dispersion as well are determined, a pixel value of which both the mean value and the dispersion are the same as the mean value and the dispersion thus determined is generated at random, and a pixel value 60 of the comment information is replaced by the pixel value 61 generated at random.

Here, as the comment erase processing, there are shown two examples as mentioned above. However, it is possible to consider other modifications, for example, in which an algorithm wherein a pixel value of the comment information is replaced by the mean value of the pixel values of the overall area of the frame image, or the mean value of the pixel values of the area, of two areas 51 and 52 shown in FIG. 11, at the side involved in recording of the comment information, or an alternative algorithm wherein a pixel values of the comment information is evenly replaced by a pixel value of a certain gray density, is added as a variation of the comment erase algorithm.

According to the present embodiment, there is provided such an arrangement that the comment erase screen shown in FIG. 6 is displayed to not only designate whether the comment information is to be erased, but also designate a comment erase algorithm. But according to the present invention, it is acceptable to provide such an arrangement that an operator is permitted only to designate whether the comment information is to be erased, and an algorithm for determining whether the comment information is clearly erased is prepared beforehand, and then an algorithm capable of erasing the comment information most clearly is automatically selected among from a plurality of comment erase algorithms. Alternatively, it is acceptable that only one fine algorithm is prepared, but not preparing a plurality of comment erase algorithms, and when comment information is erased, the comment information is always erased in accordance with the fine algorithm.

Further, according to the embodiments mentioned above, the comment information is detected in accordance with both the information representative of a position of the comment information, as shown in FIG. 11, and the information representative of color range and density range of the comment information in the event that the comment information exists, as shown in FIG. 12. However, it is acceptable that the comment information is detected in accordance with only the position information, as shown in FIG. 11, or only the information representative of color range and density range of the comment information, as shown in FIG. 12. Or alternatively, it is also acceptable that the comment information is detected in accordance with either of the color range and the density range. Further, alternatively, it is also acceptable that the comment information is detected in accordance with a combination of either of the color range and the density range, and the position information, as shown in FIG. 11.

As mentioned above, according to an image processing apparatus of the present invention, it is possible to remove comment information, even if the comment information is optically recorded inside a frame image at the time of taking a photograph, without making sacrifice of an image of a peripheral portion.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image processing apparatus comprising:
   an input unit for inputting an image from a developed photographic film;
   a determination unit for determining whether comment information recorded by a camera at the time of taking a photograph exist inside the image entered from said input unit; and
   an erase unit for erasing comment information by replacing a pixel value of the comment information determined to exist inside the image by said determination unit with another pixel value.

2. An image processing apparatus according to claim 1, further comprising a storage unit for storing information of specifying a position inside the image involved in a possibility of the presence of the comment information,
   wherein said determination unit determines the presence of the comment information in accordance with the information stored in said storage unit.

3. An image processing apparatus according to claim 1, further comprising a storage unit for storing information of specifying a color and/or a density of the comment information,
   wherein said determination unit determines the presence of the comment information in accordance with the information stored in said storage unit.

4. An image processing apparatus according to claim 1, further comprising a storage unit for storing information of specifying at least one of a color and a density of the comment information, and a position inside the image involved in a possibility of the presence of the comment information,
   wherein said determination unit determines the presence of the comment information in accordance with the information stored in said storage unit.

5. An image processing apparatus according to claim 1, wherein said erase unit replaces a pixel value of the comment information by a pixel value produced in accordance with a pixel value of an area closed to the comment information.

6. An image processing apparatus according to claim 2, wherein said erase unit replaces a pixel value of the comment information by a pixel value produced in accordance with a pixel value of an area closed to the comment information.

7. An image processing apparatus according to claim 3, wherein said erase unit replaces a pixel value of the comment information by a pixel value produced in accordance with a pixel value of an area closed to the comment information.

8. An image processing apparatus according to claim 4, wherein said erase unit replaces a pixel value of the comment information by a pixel value produced in accordance with a pixel value of an area closed to the comment information.

* * * * *